Aug. 9, 1960 W. KOPP ET AL 2,948,204
CAMERAS
Filed April 15, 1957 8 Sheets-Sheet 1

FIG.1

INVENTORS
Wilhelm Kopp. Hermann
Ploss. Hans Mell.
BY Michael S. Striker
Attorney

Aug. 9, 1960   W. KOPP ET AL   2,948,204
CAMERAS
Filed April 15, 1957   8 Sheets-Sheet 2

INVENTORS
Wilhelm Kopp.
Hermann Plass.
Hans Hell.
BY Michael S. Striker
Attorney

FIG. 7

FIG. 11

# United States Patent Office 2,948,204
Patented Aug. 9, 1960

2,948,204

CAMERAS

Wilhelm Kopp, Wiesbaden-Sonnenberg, Hermann Ploss, Wiesbaden-Kastel, and Hans Hell, Wiesbaden-Freudenberg, Germany, assignors to Adox Kamerawerk G.m.b.H., Wiesbaden-Bieberich, Germany Filed Apr. 15, 1957, Ser. No. 652,960

Claims priority, application Germany Apr. 13, 1956

13 Claims. (Cl. 95—31)

The invention relates to a roll film camera with an interchangeable magazine and especially to such cameras having means for the exact adjustment of the picture plane in regard to the objective focal distance and the transverse positioning on the optical axis of the objective and also having means for producing light-tight seals where the light passage is divided.

It is known in cameras of this type to arrange positioning studs on the casing of the interchangeable magazine, to obtain an exact positioning of the interchangeable magazine on the inside of the camera. These positioning studs provided on the casing of the interchangeable magazine should also ensure that the division of the light passage on inserting the interchangeable magazine is correctly closed and light-tight. This known arrangement and construction of the positioning studs has, however, a number of disadvantages. As the casing of the interchangeable magazine is made from a soft pressing it is possible to deform it in the neighbourhood of the positioning studs fitted thereon so that an exact adjustment of the picture plane in relation to the objective focal distance and transverse positioning to the optical axis of the objective is not assured. As the means for producing a light-tight seal at the division of the light passage is fitted also to the casing of the interchangeable magazine which is made from a soft pressing, a distortion of this part is also possible so that then a light-tight seal cannot be guaranteed.

In order to avoid this disadvantage, according to the invention the means for exact focussing of the picture plane and the means for light-tight sealing of the division of the light passage are arranged on the rigid diaphragm frame of the interchangeable magazine on one hand, and on the rigid objective carrier of the camera on the other. It is thereby achieved that, without interposition of the impressionable walls of the casing of the interchangeable magazine and the camera, the picture plane of the interchangeable magazine is fixed opposite the objective merely by means of rigid parts. Tilting of the picture plane in regard to the optical axis of the objective need no longer be feared. This rigid bearing is at the same time of very great advantage also for the light-tight seal for the division of the light passage while the means fixed partly on the front and partly on the inside of the camera must exactly agree with one another to make a light-tight seal in one another. Through the fixing of this sealing means for the division of the light passage opposite the rigid parts of the camera, namely the objective carrier, and the rigid part of the interchangeable magazine, namely the diaphragm frame, any bending of this sealing means in use will be avoided and the seal for the division of the light passage will be kept light-tight.

The means for exact focussing of the picture plane in regard to the objective focal length and the vertical position on the optical axis of the objective can consist for example of positioning studs which are attached to the diaphragm frame of the interchangeable magazine or to the objective carrier while the other of these two parts is provided with positioning locations for the positioning studs. One can with advantage make the positioning studs and the positioning locations out of specially hard material and have fine limits to ensure a more exact positioning of the interchangeable magazine.

In the preferred embodiment of the invention both the diaphragm frame of the interchangeable magazine and the objective carrier of the camera are provided with positioning studs which connect with the bearing studs on the diaphragm frame and the objective carrier.

In this embodiment of the invention a specially simple construction of the studs placed on one another is possible so that the interchangeable magazine can be adjusted very exactly in the camera in a very simple way.

As in many cases the camera casing on the inside projects over the objective carrier and the casing of the interchangeable magazine projects over the diaphragm frame, it is advantageous that the camera casing and the casing of the interchangeable magazine be provided with holes through which the positioning studs project. The positioning studs are thereby not in direct fixed connection with the two casings, so that any distortion of the casing walls can in no way exert any effect on the positioning studs and the adjustment of the interchangeable magazine cannot thereby come into question.

The means for light-tight sealing for the division of the light passage can consist with advantage of labyrinth-like ridges and grooves fitting into one another. Preferably, the grooves and ridges are arranged alternately on the inside of the camera casing and the outside of the casing of the interchangeable magazine around the opening for the light passage while the casing in the immediate vicinity of its ridges and grooves is rigidly connected with the objective carrier, and the casing of the interchangeable magazine in the immediate vicinity of its ridges and grooves is rigidly connected with the diaphragm frame. In this embodiment of the invention, a specially simple and advantageous manufacture of the light sealing means is possible. As this, of course, has no pressure to take up it can with advantage be formed in the camera casing and in the casing of the interchangeable magazine; however, then it is necessary to connect rigidly this part of the casing in the immediate vicinity of the ridges and grooves with the corresponding rigid part, namely the objective carrier and the diaphragm frame.

In a preferred embodiment of the invention these grooves and ridges are formed concentric or approximately concentric to a circular arc and arranged concentric to the optical axis of the camera casing on one side, and concentric to the optical axis of the interchangeable magazine on the other. This development and arrangement of the ridges and grooves is especially favourable for the manufacture as they can be milled out in one operation.

It is advantageous to form the individual grooves and ridges conical in section as thereby more certain and safer attachment of the interchangeable magazine is made possible.

The lateral distance of the labyrinth is with advantage greater than the clearance of the interchangeable magazine to the inside of the camera. This applies also in regard to the clearance in cross section of the interchangeable magazine as also in the direction normal to the interchangeable magazine.

In the following description, reference will be made to the accompanying drawings, in which.

Figure 1:
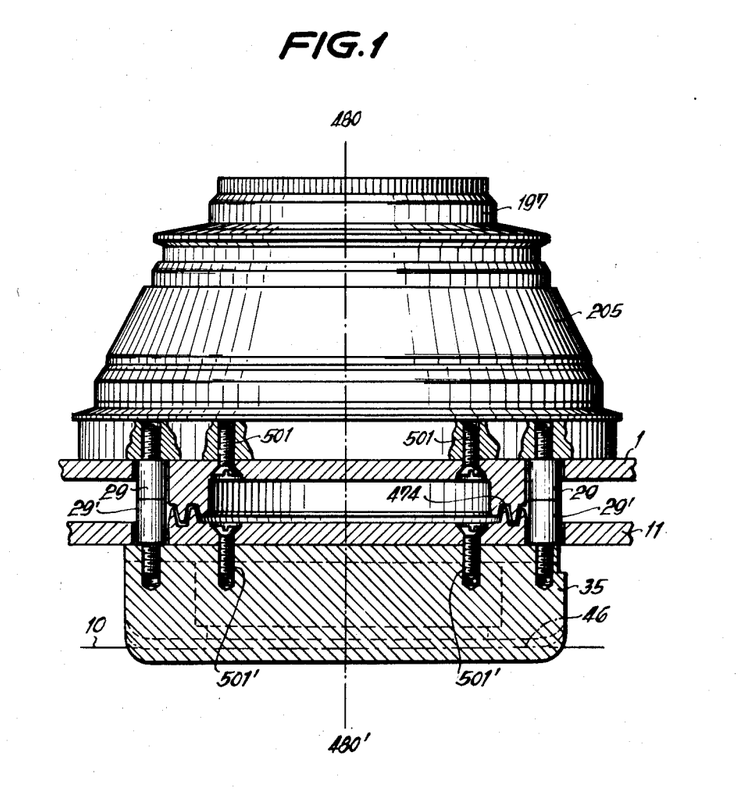
Figure 1 is a partial representation of a camera casing with an objective carrier and an interchangeable magazine partly in section.
Figure 2:
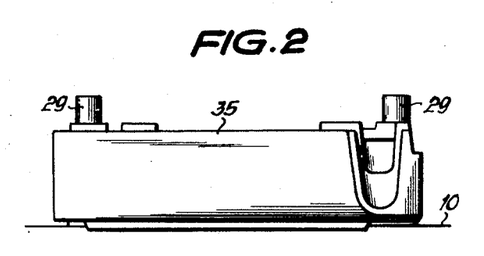
Figure 2 shows the diaphragm frame of the interchangeable magazine in plan view.
Figure 3:
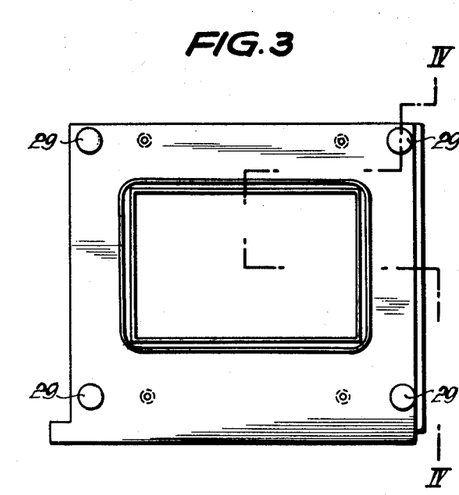
Figure 3 shows the diaphragm frame of the interchangeable magazine in front elevation.

Figure 1 shows an objective carrier 205 with its positioning studs 29, also the diaphragm frame 35 of the interchangeable magazine with its positioning studs 29'. In Figure 1 there is also seen a part of the camera casing 1, a part of the casing 11 of the interchangeable magazine and the light protecting labyrinth 474 fitted to both casing parts. The objective 197 is fixed in the objective carrier 205. The optical axis of the objective is indicated by 480 and that of the interchangeable magazine by 480'. As Figure 1 shows it covers both optical axes 480 and 480'. On the diaphragm frame 35 of the interchangeable magazine the positioning studs 29' are directly fastened. They are thereby independent of the condition of the pressure moulding material and independent of the accuracy in size of the pressure moulded body 11 of the interchangeable magazine. These positioning studs 29' are preferably made from stainless steel. They are firmly attached to the diaphragm frame 35 before the installation of the diaphragm frame 35 and are set off a definite distance with respect to the film guide track 46 which is formed on the rear side of the diaphragm frame 35. This setting off is made possible as, in a known manner, the film guide track 46 is ground and thereafter the positioning studs 29' are ground to the dimension required. Instead of such plane grinding, the positioning studs 29' can be each adjusted before the diaphragm frame 35 is attached to the casing 11 of the interchangeable magazine by means of the screws 501'. The positioning studs 29 are attached direct on the objective carrier 205 in the same way as the positioning studs 29' of the diaphragm frame 35. The objective carrier 205 with the positioning studs 29 attached to it with respect to the distance of the objective 197 in the same way as was done with the diaphragm frame 35 before the attachment to or attachment in the camera casing 1. The positioning studs 29 are firmly fixed to the objective carrier 205 and are set off with regard to the previously mentioned positioning distance for a fixed objective 197 or an interchangeable objective 197. After this has been done the so-called objective carrier 205 can be attached to the camera casing 1.

As is seen from Figure 1, since in both parts the positioning studs 29 and 29' have been fixed and adjusted, the objective carrier 205 and the diaphragm frame 35 can be attached to one another without being affected by the pressing-formed part of the camera casing 1 and the casing 11 of the interchangeable magazine.

In the arrangement shown in Figure 1, the performance of an objective 197 as such or the accuracy of the adjustment of the parts spaced from one another, namely the objective 197 from the picture plane 46, can be checked without the objective carrier 205 and the diaphragm frame 35 in the camera casing 1 and the casing 11 of the interchangeable magazine respectively being fitted together.

It is thus possible to mass produce the objective carrier 205 and the diaphragm 35 independently from one another and independently from the nature of the casing parts, that is the camera casing 1 and the casing 11 of the interchangeable magazine, and to complete them with the fitted-in positioning studs 29 and 29' respectively adjusted to the previously described dimensions. It should be further mentioned that it is advantageous that the positioning studs 29' of the diaphragm frame 35 and the positioning studs 29 of the objective carrier 205 possess the same unfinished size so that in this respect the finishing can be carried out economically.

There is, however, always the possibility of fitting the positioning studs 29 to only one of the two parts either the diaphragm frame 35 or the objective carrier 205. The opposite lying part is then provided in the corresponding position with a positioning location for these studs 29. The adjustment is made in the same way as in the case of both parts having positioning studs 29 or 29' respectively.

Figure 4:
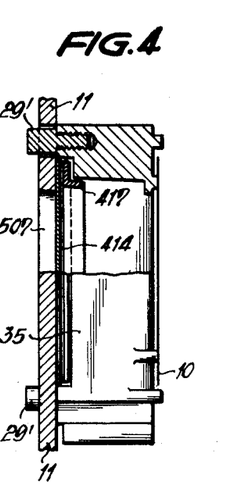
Figure 4 shows a part section of the interchangeable magazine with partly sectioned diaphragm frame along IV—IV of Figure 3.
Figure 6:
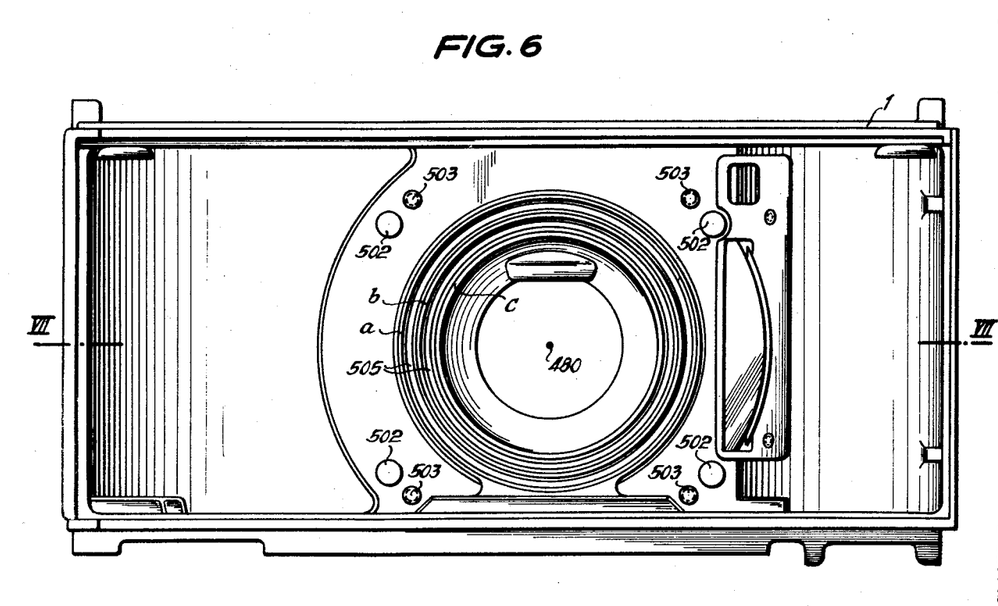
Figure 6 is an internal view of the camera casing seen towards the front.

In both cases the casing portions 1 or 11 in the corresponding position where the positioning studs 29 or 29' are found, are provided with holes 502 through which the positioning studs 29 can easily engage (see Figures 4 and 6).

The part of the camera casing 1 and the casing 11 of the interchangeable magazine shown in Figure 1 are provided with a light-sealing labyrinth 474. In the immediately vicinity of this labyrinth 474 the camera casing 1 is rigidly connected with the objective carrier 205 by means of screws 501. In order to ensure this rigid connection the camera casing is provided with accurately fitting holes 503 through which the screw shanks pass. In the same way the casing 11 of the interchangeable magazine in the immediate vicinity of the labyrinth 474 is rigidly fastened to the diaphragm frame by means of the screws 501'. Through the combined effect on these rigid connections and of the positioning studs 29 fitted to the diaphragm frame 35 and the positioning studs 29' fitted to the objective carrier 205, the position of the labyrinth in the direction of the optical axis is accurately fixed when the interchangeable magazine is fitted in the camera and held therein by means of springs.

Figure 5:
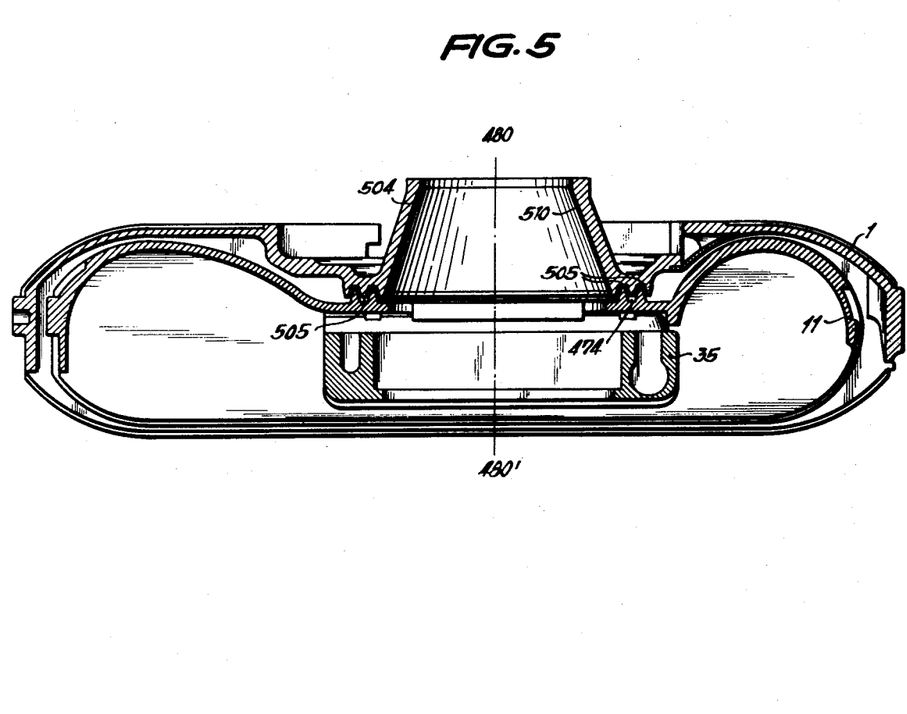
Figure 5 shows the camera casing with the inserted casing and diaphragm frame of the interchangeable magazine in horizontal section.
Figure 7:
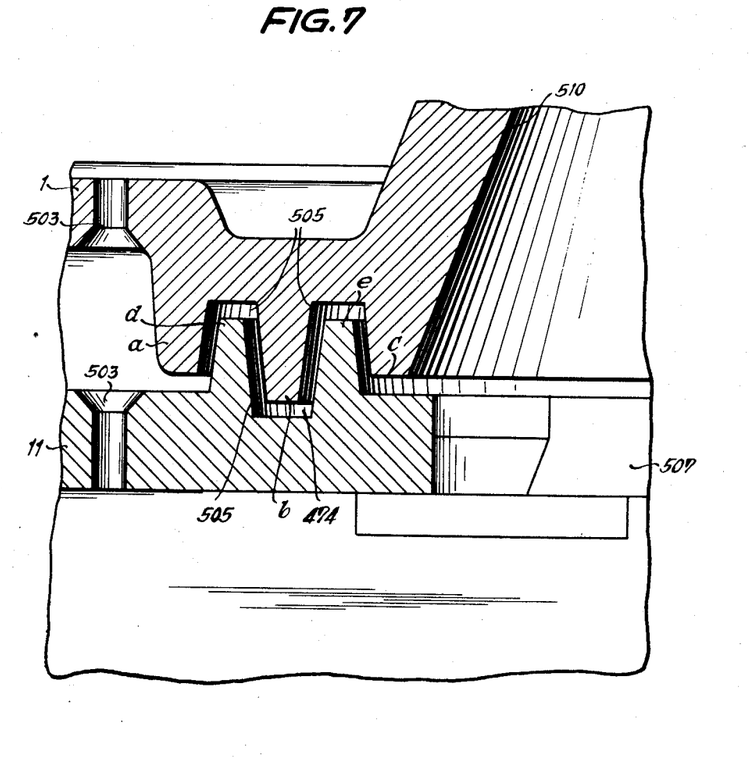
Figure 7 shows a greatly enlarged section through the light preventing labyrinth along VII—VII of Figure 6.

As can be seen from Figures 5, 6 and 7 several grooves 505 and ridges $a$ to $e$ are arranged around the light aperture 507 (see Figure 8) of the interchangeable magazine and the light passage 510 (see Figure 5) of the camera casing. These grooves 505 and ridges $a$ to $e$ are arranged alternately on the casing 11 of the interchangeable magazine and the casing 1 of the camera to one another so that when the interchangeable magazine is fitted a light sealing labyrinth 474 is formed.

The groove 505 and ridges $a$ to $e$ can be made in a rectangular shape which is suitable to the shape of the picture aperture 507. As, however, these grooves 505 must be subsequently machined while the camera casing 1 and casing 11 of the interchangeable magazine are mostly made from pressings it is more advantageous to arrange the grooves 505 in a circular form. Thereby it is possible for the machining to be done with simple apparatus, for instance on a lathe or with a suitable milling machine.

In order to increase the certainty of the light sealing of the dividing position of the light passage 510 it is preferable to provide several concentric grooves 505 and ridges $a$ to $e$. The lateral distance between the interconnecting ridges $a$—$d$, $d$—$b$, $b$—$e$ and $e$—$c$ is larger than the play of the interchangeable magazine in the inside of the camera. Thereby the possibility is avoided that these ridges can engage into one or more positions and possibly strike hard on one another. The distance of the points of the ridges $a$ to $e$ to the bottom of the grooves 505 is defined by the fitting of the positioning studs 29 and 29' to one another.

The individual grooves 505 and ridges a, b and c of the camera casing 1 are shown in Figure 6 which shows the casing 1 of the camera from the rear in the direction of the support 504 (see Figure 5). Furthermore in this figure the holes 502 for the positioning studs 29 of the objective carrier 205, are to be seen. In addition the holes 503 for the screws 501 are visible with which the objective carrier 205 is fastened to the casing 1 of the camera.

Figure 8:
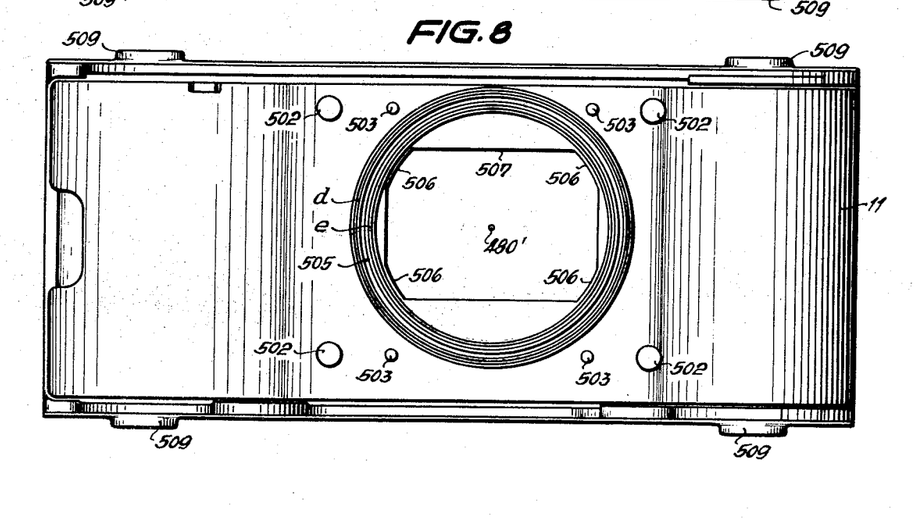
Figures 8 and 9 show the interchangeable magazine in front view and plan.
Figure 9:
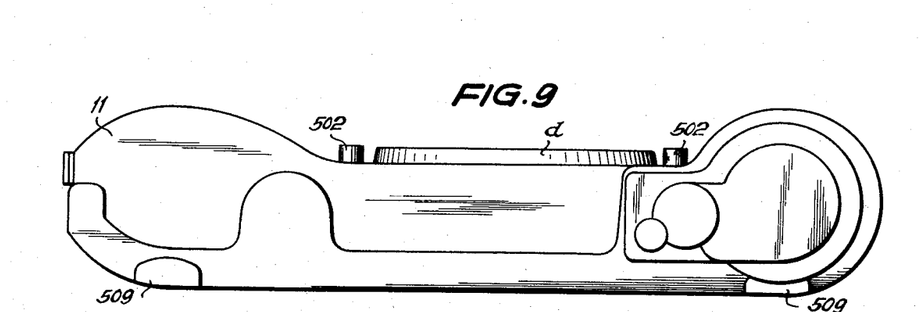

Figure 8 shows a view of the interchangeable magazine from the front in the direction of the light sealing grooves 505. The ridges of the light sealing grooves 505 of the interchangeable magazine are indicated by d and e. In the casing 11 of the interchangeable magazine there are also on the front the holes 502 for the positioning studs 29' of the diaphragm frame 35 and the holes 503 for the screws 501' with which the casing 11 and the diaphragm frame 35 are rigidly connected together.

The bosses fitted to the upper and lower sides of the casing 11 of the interchangeable magazine serve for the supporting or fixing of the interchangeable magazine on the inside of the camera in the vertical direction.

The aperture 507 of the interchangeable magazine is aligned on the front side with the ridge c and rounded off at the corners 506. It can also be made octagonal. This is possible with the use of a special objective, without a vignetting of the picture corners of the picture aperture 24 arising. Through this arrangement of the opening 507 of the front wall 11 of the interchangeable magazine, a considerably smaller shaping of the whole camera is achieved.

Figure 10:
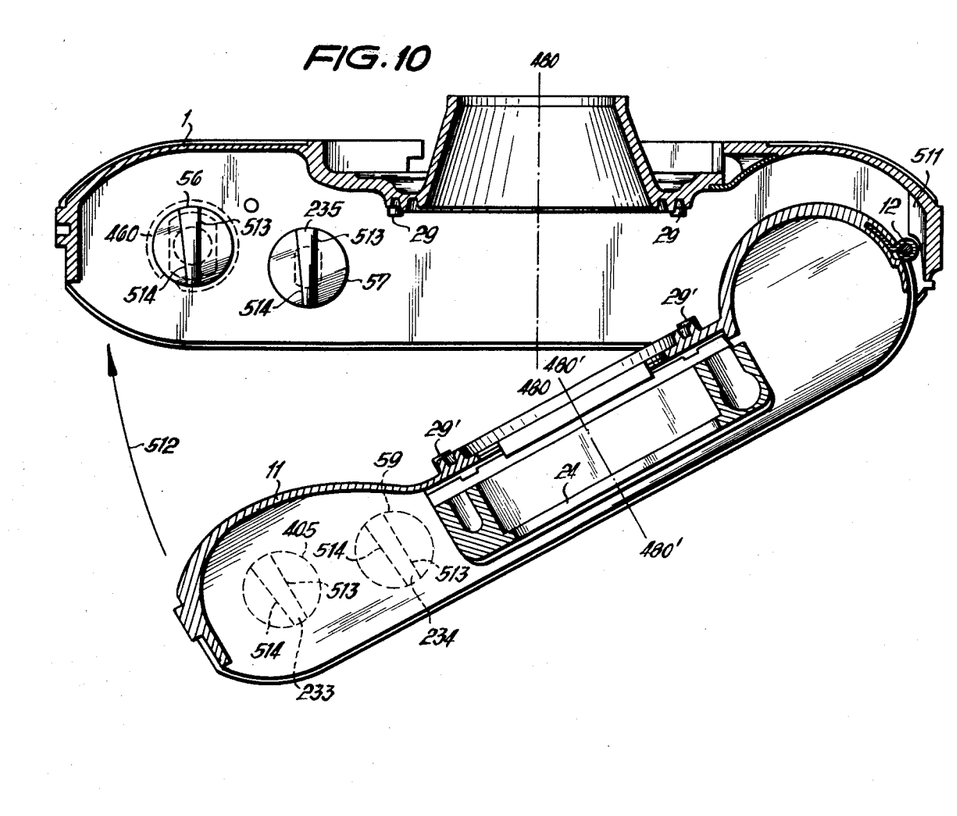
Figure 10 shows in horizontal section the camera casing and the interchangeable magazine in the state of fitting the interchangeable magazine.

Figure 10 shows the casing 1 of the camera with the two coupling pieces 57 and 460 fitted in the camera and also the interchangeable magazine 11, 13 with the corresponding coupling pieces 405 and 59. The couplings 460, 405 provide the connection for operating the cover slide and the couplings 57, 59 provide the connection for operating the film change mechanism of the interchangeable magazine. In the position shown, the interchangeable magazine 11, 13 is in the process of being fitted in the casing 1 of the camera.

The assembly is carried out in the following way: the interchangeable magazine 11 is laid with its rear wall hinge 12 on the bearing bosses 511 of the camera and swung into the camera in the direction of the arrow 512, as shown in Figure 10. Then the couplings 405 and 59 of the interchangeable magazine connect by their grooves 233 and 234 respectively over the projections 56 and 235 of the couplings 460 and 57 of the camera casing.

By the special formation of the coupling elements shown in which the side 513 turned towards the bearing bosses 511 is parallel to the optical axis 480—480' and the other side 514 is made with a definite angle thereto, a perfect transmission of the effective force is assured. By this one sided conical formation of the coupling element, the assembly of the interchangeable magazine in the camera is also made possible without difficulty.

Figure 11:
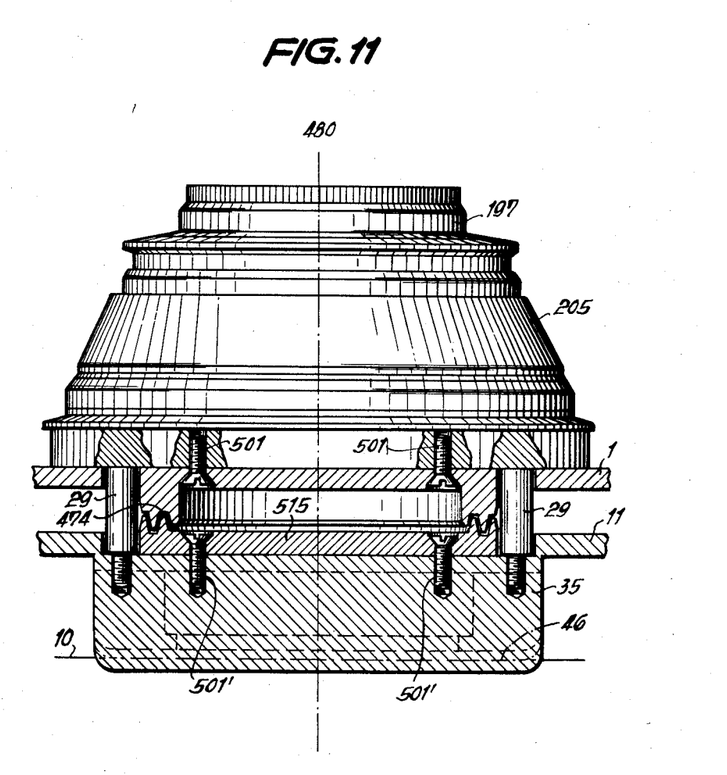
Figure 11 shows another form of embodiment of the invention in the corresponding representation to Figure 1.

In the embodiment shown in Figure 11 the diaphragm frame 35 is made in one piece with the front wall 11 of the interchangeable magazine. The positioning studs 29 are, however, fixed in the diaphragm frame which in this embodiment can be made longer. The positioning studs 29 are fitted with their prepared front surface on the rear surface of the objective carrier 205. In this embodiment of the invention for the above reason the whole rear surface or only a part of this surface is adjusted by exact grinding in relation to the optical axis 480. In the same way the positioning studs 29 are adjusted in relation to the focal length of the objective and the optical axis 480'. This can be done in the same way as in the embodiment according to Figure 1.

The individual parts of the light sealing labyrinth 474 which are fitted to the interchangeable magazine in this embodiment are attached to a plate 515, which in addition carries the picture aperture 507. The plate 515 is firmly held to the diaphragm frame 35 by means of screws 501'.

What is claimed is:

1. In a camera, in combination, a camera housing adapted to receive a magazine in its interior; a magazine housing insertable into and removable from said camera housing; a rigid objective carrier carried by said camera housing and having a rear surface directed toward the rear of said camera housing; a rigid film guide carried by said magazine housing for guiding film for movement in the magazine housing and for locating the film during exposure thereof in a predetermined film plane, said rigid film guide having a front surface directed toward said objective carrier; and positioning means carried by said surfaces of said objective carrier and film guide for locating said film guide at a precisely determined position along the optical axis so as to precisely determine the position of the film plane, at least one of said housings being formed with a plurality of openings and said postioning means including a plurality of rigid pins respectively extending with clearance through said openings so that bending or deformation of said one housing will have no influence on said pins.

2. In a camera, in combination, a camera housing adapted to receive a magazine in its interior; a magazine housing insertable into and removable from said camera housing; a rigid objective carrier carried by said camera housing and having a rear surface directed toward the rear of said camera housing; a rigid film guide carried by said magazine housing for guiding film for movement in the magazine housing and for locating the film during exposure thereof in a predetermined film plane, said rigid film guide having a front surface directed toward said objective carrier; and positioning means carried by said surfaces of said objective carrier and film guide for locating said film guide at a precisely determined position along the optical axis so as to precisely determine the position of the film plane, said positioning means including a plurality of rigid pins extending parallel to the optical axis between said surfaces.

3. In a camera, in combination, a camera housing adapted to receive a magazine in its interior; a magazine insertable into and removable from said camera housing; a rigid objective carrier carried by said camera housing and having a rear surface directed toward the rear of said camera housing; a rigid film guide carried by said magazine for guiding film for movement in the magazine and for locating the film during exposure thereof in a predetermined film plane, said rigid film guide having a front surface directed toward said objective carrier, one of said surfaces being flat and located in a plane normal to the optical axis; and a plurality of positioning pins fixed to the other of said surfaces, extending therefrom in a direction parallel to the optical axis, and having free ends engaging said one surface, so that said one surface cooperates with said pins to precisely determine the location of said film plane.

4. In a camera, in combination, a camera housing adapted to receive a magazine in its interior; a magazine housing insertable into and removable from said camera housing; a rigid objective carrier carried by said camera housing and having a rear surface directed toward the rear of said camera housing; rigid film guide means carried by said magazine housing for guiding film for movement in the magazine housing and for locating the film during exposure thereof in a predetermined film plane, said rigid film guide means having a front surface directed toward said objective carrier; a plurality of rigid positioning pins fixed to said objective carrier and extending from said surface thereof rearwardly toward said film guide means and being parallel to the optical axis; and a plurality of positioning pins fixed to said film guide means and extending forwardly from said surface thereof toward said objective carrier, the plurality of pins which are fixed to said film guide means respectively having free ends which engage free ends of said positioning pins which extend rearwardly from said surface of said objective carrier, so that said pins cooperate to precisely determine the position of the film plane along the optical axis.

5. In a camera, in combination, a camera housing adapted to receive a magazine in its interior; a magazine housing insertable into and removable from said camera housing; a rigid objective carrier carried by said camera housing and having a rear surface directed toward the rear of said camera housing; rigid film guide means carried by said magazine housing for guiding film for movement in the magazine housing for locating the film during exposure thereof in a predetermined film plane, said rigid film guide means having a front surface directed toward said objective carrier; and positioning means carried by said surfaces of said objective carrier and film guide means for locating said film guide means at a precisely determined position along the optical axis so as to precisely determine the position of the film plane, said positioning means including at least one set of rigid, corrosion-resistant positioning pins extending from one of said surfaces toward the other of said surfaces.

6. In a camera, in combination, a camera housing adapted to receive a magazine in its interior; a magazine housing insertable into and removable from said camera housing; a rigid objective carrier carried by said camera housing and having a rear surface directed toward the rear of said camera housing; rigid film guide means carried by said magazine housing for guiding film for movement in the magazine housing and for locating the film during exposure thereof in a predetermined film plane, said rigid film guide means having a front surface directed toward said objective carrier; and positioning means carried by said surfaces of said objective carrier and film guide means for locating said film guide means at a precisely determined position along the optical axis so as to precisely determine the position of the film plane, said positioning means including at least one set of rigid positioning pins extending from one of said surfaces toward the other of said surfaces in a direction parallel to the optical axis, and said pins being longitudinally adjustable so that the position of the film plane may be adjusted.

7. In a camera, in combination, a camera housing adapted to receive a magazine in its interior; a magazine housing insertable into and removable from said camera housing; a rigid objective carrier carried by said camera housing and having a rear surface directed toward the rear of said camera housing; rigid film guide means carried by said magazine housing for guiding film for movement in the magazine and for locating the film during exposure thereof in a predetermined film plane, said rigid film guide means having a front surface directed toward said objective carrier; and positioning means carried by said surfaces of said objective carrier and film guide means for locating said film guide means at a precisely determined position along the optical axis so as to precisely determine the position of the film plane, said positioning means including at least four pins extending parallel to the optical axis from one of said surfaces toward the other of said surfaces, and said four pins being respectively located at the corners of a rectangle in a plane normal to the optical axis.

8. In a camera, in combination, a camera housing adapted to receive a magazine in its interior; a magazine housing insertable into and removable from said camera housing; a rigid objective carrier carried by said camera housing and having a rear surface directed toward the rear of said camera housing; rigid film guide means carried by said magazine housing for guiding film for movement in the magazine housing and for locating the film during exposure thereof in a predetermined film plane, said rigid film guide means having a front surface directed toward said objective carrier; and positioning means carried by said surfaces of said objective carrier and film guide means for locating said film guide means at a precisely determined position along the optical axis so that to precisely determine the position of the film plane; and light-tight means carried in part by said objective carrier and in part by said film guide means, said parts of said light-tight means cooperating together when said positioning means locates the film plane of said film guide means in its proper position, to prevent light from moving radially past said light-tight means toward the optical axis, said light-tight means extending completely around the optical axis and surrounding the openings of said objective carrier and film guide means, respectively, through which light passes to the film plane, said light-tight means including a plurality of endless ribs and grooves carried by said objective carrier and by said film guide means, the endless ribs and grooves of said film guide means respectively extending into and receiving the grooves and ribs of said objective carrier.

9. In a camera, in combination, a camera housing adapted to receive a magazine in its interior; a magazine housing insertable into and removable from said camera housing; a rigid objective carrier carried by said camera housing and having a rear surface directed toward the rear of said camera housing; rigid film guide means carried by said magazine housing for guiding film for movement in the magazine housing and for locating the film during exposure thereof in a predetermined film plane, said rigid film guide means having a front surface directed toward said objective carrier; and positioning means carried by said surfaces of said objective carrier and film guide means for locating said film guide means at a precisely determined position along the optical axis so as to precisely determine the position of the film plane; and light-tight means carried in part by said objective carrier and in part by said film guide means, said parts of said light-tight means cooperating together when said positioning means locates the film plane of said film guide means in its proper position, to prevent light from moving radially past said light-tight means toward the optical axis, said light-tight means extending completely around the optical axis and surrounding the openings of said objective carrier and film guide means, respectively, through which light passes to the film plane, said light-tight means including a plurality of endless ribs and grooves carried by said objective carrier and by said film guide means, the endless ribs and grooves of said film guide means respectively extending into and receiving the grooves and ribs of said objective carrier, and the ribs of said film guide means alternating with the ribs of said objective carrier when said parts of said light-tight means cooperate together to prevent light from moving past said light-tight means toward the optical axis.

10. In a camera, in combination, a camera housing adapted to receive a magazine in its interior; a magazine housing insertable into and removable from said camera housing; a rigid objective carrier carried by said camera housing and having a rear surface directed toward the rear of said camera housing; rigid film guide means carried by said magazine housing for guiding film for movement in the magazine housing and for locating the film during exposure thereof in a predetermined film plane, said rigid film guide means having a front surface directed toward said objective carrier; and positioning means carried by said surfaces of said objective carrier and film guide means for locating said film guide means at a precisely determined position of the film plane; and light-tight means carried in part by said objective carrier and in part by said film guide means, said parts of said light-tight means cooperating together when said positioning means locates the film plane of said film guide means in its proper position, to prevent light from moving radially past said light-tight means toward the optical axis, said light-tight means extending completely around the optical axis and surrounding the openings of said objective carrier and film guide means, respectively, through which light passes to the film plane, said magazine housing having a predetermined play in said camera housing and said parts of said light-tight means having with respect to each other a play in directions perpendicular to the optical axis greater than the play of said magazine housing with respect to said camera housing.

11. In a camera, in combination a camera housing adapted to receive a magazine in its interior; a magazine housing insertable into and removable from said camera housing; and rigid objective carrier carried by said camera housing and having a rear surface directed toward the rear of said camera housing; rigid film guide means carried by said magazine housing for guiding film for movement in the magazine housing and for locating the film during exposure thereof in a predetermined film plane, said rigid film guide means having a front surface directed toward said objective carrier; and positioning means carried by said surfaces of said objective carrier and film guide means for locating said film guide means at a precisely determined position along the optical axis so as to precisely determine the position of the film plane; and light-tight means carried in part by said objective carrier and in part by said film guide means, said parts of said light-tight means cooperating together when said positioning means locates the film plane of said film guide means in its proper position, to prevent light from moving radially past said light-tight means toward the optical axis, said light-tight means extending completely around the optical axis and surrounding the openings of said objective carrier and film guide means, respectively, through which light passes to the film plane, said light-tight means including a plurality of endless ribs and grooves carried by said objective carrier and by said film guide means, the endless ribs and grooves of said film guide means respectively extending into and receiving the grooves and ribs of said objective carrier, each of said ribs and each of said grooves having a cross section which is at least in part frustoconical.

12. In a camera, in combination, a camera housing adapted to receive a magazine in its interior; a magazine housing insertable into and removable from said camera housing; a rigid objective carrier carried by said camera housing and having a rear surface directed toward the rear of said camera housing; rigid film guide means carried by said magazine housing for guiding film for movement in the magazine housing and for locating the film during exposure thereof in a predetermined film plane, said rigid film guide means having a front surface directed toward said objective carrier; and positioning means carried by said surfaces of said objective carrier and film guide means for locating said film guide means at a precisely determined position along the optical axis so as to precisely determine the position of the film plane; and light-tight means carried in part by said objective carrier and in part by said film guide means, said parts of said light-tight means cooperating together, when said positioning means locates the film plane of said film guide means in its proper position, to prevent light from moving radially past said light-tight means toward the optical axis, said light-tight means extending completely around the optical axis and surrounding the openings of said objective carrier and film guide means, respectively, through which light passes to the film plane, said light-tight means extending along a circle whose center is in the optical axis, said magazine housing having a front wall formed with an opening surrounded by said circular light-tight means and through which light passes to the film plane, said opening of said front wall of said magazine being rectangular except for its corners which are rounded at said circular light-tight means.

13. In a camera, in combination, a camera housing adapted to receive a magazine in its interior; a magazine housing insertable into and removable from said camera housing; a rigid objective carrier carried by said camera housing and having a rear surface directed toward the rear of said camera housing; rigid film guide means carried by said magazine housing for guiding film for movement in the magazine housing and for locating the film during exposure thereof in a predetermined film plane, said rigid film guide means having a front surface directed toward said objective carrier; and positioning means carried by said surfaces of said objective carrier and film guide means for locating said film guide means at a precisely determined position along the optical axis so as to precisely determine the position of the film plane, said magazine housing having an exterior surface portion and said camera housing having in its interior an interior surface portion, and said surface portions cooperating with each other and engaging each other to guide said magazine during its movement into and out of said magazine housing, and said surface portions of said housing being spaced from and out of engagement with each other when said positioning means operates to determine the location of said film plane in the final position of said magazine in said camera housing, the surface portion of the magazine which cooperates with the surface portion of said camera housing being in the form of a hinge which turnably connects a rear wall of the magazine to the remainder of the magazine housing.

References Cited in the file of this patent

UNITED STATES PATENTS

| | | |
|---|---|---|
| 2,590,409 | Hineline | Mar. 25, 1952 |
| 2,633,065 | Perlin | Mar. 31, 1953 |

FOREIGN PATENTS

| | | |
|---|---|---|
| 834,548 | France | Oct. 22, 1938 |
| 720,603 | Germany | July 16, 1942 |